United States Patent [19]

Miller

[11] Patent Number: 4,877,124

[45] Date of Patent: Oct. 31, 1989

[54] CONVEYOR SYSTEM AND METHOD FOR TRANSPORTING MATERIALS

[75] Inventor: Murrell T. Miller, Portland, Oreg.

[73] Assignee: ACRAVAC, Portland, Oreg.

[21] Appl. No.: 198,513

[22] Filed: May 25, 1988

Related U.S. Application Data

[62] Division of Ser. No. 947,041, Dec. 29, 1986, Pat. No. 4,766,994.

[51] Int. Cl.⁴ ............................................. B65G 17/36
[52] U.S. Cl. .................................... 198/711; 198/713
[58] Field of Search ............... 198/707, 708, 711, 713, 198/714, 833, 835, 844, 847

[56] References Cited

U.S. PATENT DOCUMENTS

| | | | |
|---|---|---|---|
| 3,637,091 | 1/1972 | Mickelson | 198/711 |
| 4,019,625 | 4/1977 | Wiese | 198/711 |
| 4,503,971 | 3/1985 | Lachmann | 198/711 |
| 4,615,434 | 10/1986 | Lachmann | 198/833 |
| 4,766,994 | 8/1988 | Miller | 198/847 |

Primary Examiner—Joseph E. Valenza
Attorney, Agent, or Firm—Marger & Johnson

[57] ABSTRACT

The present invention is directed to a conveyor belt system for transporting materials by directly driving a conveyor belt. A plurality of continuous cables are disposed generally parallel one to the other. A continuous conveyor belt is disposed between the continuous cables which includes a plurality of unitary, open top, pocket-like receptacles for transporting the materials. The receptacles are located so that they extend above and below the plane of travel of the continuous cables whereby the materials can be transported within the confines of the receptacles in both a horizontal path of travel and a vertical path of travel, respectively, until the materials are conveyed to the point of travel where they are discharged from the conveyor system for further subsequent processing. This results in the continuous, uninterrupted transportation of the materials carried by the conveyor belt for extended periods of time.

16 Claims, 2 Drawing Sheets

CONVEYOR SYSTEM AND METHOD FOR TRANSPORTING MATERIALS

This is a division of application Ser. No. 06/947,041 now U.S. Pat. No. 4,766,994, filed Dec. 29, 1986.

BACKGROUND OF THE INVENTION

This invention relates to a belt conveyor system for continuously transporting materials.

Belt conveyors, particularly belt conveyors of the bucket type are known. Chain link drive systems with buckets or pans attached have been employed to transport materials in both a horizontal and/or vertical path. Flat belting with steel or plastic buckets has also be used commercially for this purpose for material transported in an inclined path. However, these conveyors have a number of drawbacks. Most require heavy structural support, are noisy to operate, have too many moving parts, require excessive amounts of horsepower to operate, have a high cost of maintenance and repair and are difficult to clean.

Other types of conveyors, for example as described in U.S. Pat. No. 4,019,625, have buckets which are supported by transverse elements and extend between two conveyor belts. Each conveyor belt is connected to the neighboring bucket by such transverse element, but without pivotal movement between buckets at this connection. Instead, flexture of the conveyor belts is accommodated by bending of a part of the transverse bucket walls of reduced thickness. The connection of the transverse supporting element to the respective conveyor belts is fixed.

U.S. Pat. No. 4,503,971 describes a bucket-type conveying belt having along its opposite longitudinal edges, which are transversely spaced apart, a succession of pairs of blocks in the form of guide pulleys and support pulleys. These pulleys are required to assist in the conveying operation. Traction ropes and also required to relieve the belt and to permit vertical movement of the buckets. This system is quite cumbersome to operate and maintain because of its numerous coacting parts.

In U.S. Pat. No. 3,637,091 a molded plastic belt conveyor system is provided. The system includes parallel continuous cables which are driven by driving wheels. A continuous belt disposed between the cables is connected to the cables by clip means riding thereon. The belt is indirectly driven by the driving wheels since there is no substantial contact between the clip means and the driving wheels. The subject clip means includes an offset portion, the outer end of which is provided with a generally semicylindrical groove means the bottom portion of which engages the cable normal to horizontal plane of travel of the belt permitting the clip means to ride on the cables. A vertically-extending slot is located within the upper internal portion of the semicircular groove permits the clip to be spread apart and then to grip the upper portion of the cable with a snap-like action. However, due to their open construction and the fact that the plane of attachment of the cable within the groove is normal to the horizontal plane of travel of the belt, these clips do not effectively maintain continuous engagement with the cables on which they ride. Often times, they become disengaged from the cables and/or cause the cables to be disengaged from the pulleys, causing the conveyor system to become inoperable. Attempts were made to solve this problem by attaching a spring-loaded metal tab to each clip. This tab was locked about the lower portion of the cable so that the cable and belt were not movable during use one with respect to the other. Thus, the cables and the belt could not become realigned during use causing the operation of the conveyor system to be constantly interrupted.

There is, therefore, a commercial need for a belt conveyor system of the type described above in which there can be continuous relative movement of the conveyor belt and cables in order to provide an uninterrupted transportation of materials over extended periods of time.

SUMMARY OF THE INVENTION

The conveyor system of the present invention is designed to include a minimal number of structural embodiments, is easy to clean and maintain, has few working parts, has a low noise level, and requires less horsepower to operate than conventional link chain drive or flat belted conveyors presently in commercial use.

As compared to certain belt-type conveyor systems, the subject transporting containers are easily engagable and disengagable from the cables moving same, are movable in both a vertical and/or horizontal plane of travel, do not require auxiliary pulley systems to facilitate vertical conveyor movement, and do not require guide pulleys and support pulleys for the conveyor system.

The present invention is directed to a conveyor belt system for transporting materials by directly driving a conveyor belt. This is accomplished by directly driving a plurality of clip means attached at their inner end to the belt and securedly coupled at their outer end to a pair of continuous cylindrical cables. Even though the belt is directly driven, the subject conveyor system can effect continuous relative movement between the conveyor belt and cables, thereby compensating for differences in the respective lengths of said belt and cables and in the configuration of the respective drive means. This is accomplished in great part by the novel construction of clip means of this invention which is designed for facilitating secured engaged with the cables and effective and efficient movement of the conveyor belt. This results in the continuous, uninterrupted transportation of the materials carried by the conveyor belt for extended periods of time.

A plurality of clip means are attached to each of the respective transverse sides of the belt for connecting the belt to the cable. Each of the clip means include at its outer end means for securely coupling the belt to the cable and for continuous, uninterrupted movement of the belt, while at the same time permitting the respective cables and belt to move at a differential relative rate of speed.

Each of the coupling means includes means defining a cylindrical aperture disposed parallel to the direction of travel of the belt. The aperture is sized to substantially conform to the diameter of the cable for surroundingly receiving and retaining the cable within the aperture. Means are provided for defining a passageway at the outer end of the clip means for engaging and disengaging the cable within the aperture. The passageway has a width which is less than the cross-sectional diameter of the cable to allow the cables to yieldably pass through the passageway and into and out of the aperture. The passageway is oriented so that the cable will be inserted therein in a direction substantially transversely to the plane of travel of the belt.

The conveyor system preferably includes a pair of generally parallel guide rails located immediately below the clip means. Each of the guide rails has clip means supportingly riding thereon as the belt is continuously moved during the transportation of the materials. The guide rail includes groove means in that portion of each guide rail adjacent to each respective clip means for supportingly receiving the clip means and for preventing substantial sagging of the cables due to the weight of the respective belt and materials being transported. The guide rail groove means are sized to substantially conform to the configuration of that portion of the clip means riding therewithin. The guide rail preferably includes respective inner and outer raised sides having a groove disposed therebetween. The outer side is preferably disposed at a greater height than the height of the inner side for providing a further means of retaining the clip means within the guide rail groove means during the transportation of the materials.

The drive means typically comprises pulley wheel means including pulley wheel groove means located in the circumference of the pulley wheel means. The clip means rides within the pulley wheel groove means which is sized to substantially conform to the configuration of the clip means riding therewithin for directly driving the belt and for reducing the extent of slippage of the belt moving about the pulley wheel means.

The pulley wheel groove means generally comprises respective inner and outer pulley wheel sections having a circumferentially extending pulley wheel groove means disposed therebetween. The outer wheel section preferably has a larger diameter than the inner wheel section. Preferably, the coupling means includes a generally rounded lower end sized to conform to the configuration of the guide rail groove means and to ride therewithin. The coupling means can also include a generally rounded respective upper and lower end sized to conform to the configuration of the pulley wheel means and to ride therewithin. This allows the clip means to engage the pulley wheel at its lower end for movement in a substantially horizontal path of travel or at its upper end for movement in a substantially vertical path of travel.

In general, the passageway is located within the outer end of the coupling means at any of a plurality of positions which will not interfere with the substantial conformity of the configuration of the pulley wheel groove means and the clip means riding therewithin. The passageway is disposed within the outer end of the coupling means at any of a plurality of positions which are located therein at an angle between about 45° above, and 45° below, the transverse axis of the coupling means. The above transverse axis extends in a plane parallel to the transverse plane of the conveyor belt and passes through the midpoint of the cylindrical aperture. The passageway angle is measured by extending a line outwardly from the midpoint of the aperture and along the longitudinal centerline of the passageway to the outer end of the coupling means. The passageway is preferably disposed in a plurality of positions which are located between an angle of 45° above the transverse axis and the transverse axis itself, respectively, in order to maximize the angle of insertion and removal of the cable into and out of the aperture.

The foregoing and other objects, features and advantages of the invention will become more readily apparent from the following detailed description which proceeds with reference to the drawings.

DETAILED DESCRIPTION OF THE INVENTION

Figure 1:
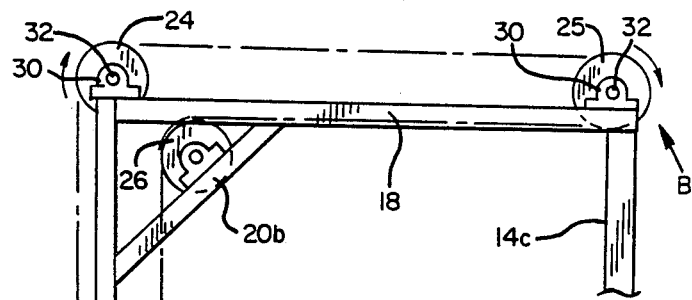
FIG. 1 is an elevational view of a preferred belt conveyor system of this invention illustrating horizontal and vertical paths of travel.
Figure 2:
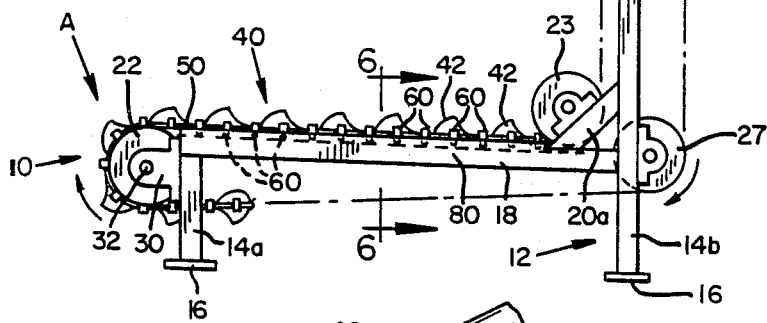
FIG. 2 is a perspective, sectional view of a clip means attached at its inner end to the continuous conveyor belt and at the outer end to a cylindrical cable.
Figure 3:
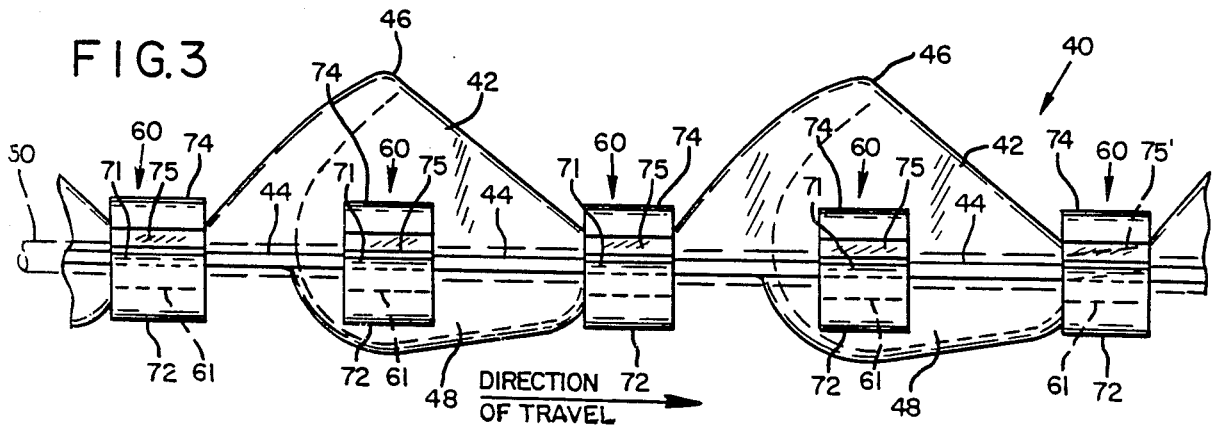
FIG. 3 is a front elevational, sectional view of the conveyor system depicted in FIG. 2.

Referring now to FIGS. 1-3, conveyor means 10 is mounted on a structural framework 12 including upright support members 14a–14c joined to base members 16. Horizontal support members 18 are joined at their respective ends to upright supports 14a–14c. Bracing members 20a and 20b are joined at one end to upright central support 14b and at the other end to horizontal support members 18.

A series of pulley wheels 22–24, respectively, are pivotally connected to pulley supports 30 by pulley shafts 32. Supports 30 are connected to structural framework 12. A continuous conveyor belt 40 is disposed between and secured to a pair of generally parallel, continous cylindrical cables 50. A plurality of clip means 60 are each attached to the respective transverse sides of belt 40. Cable 50 is secured within cylindrical aperture 68 of clip means 60.

The continuous conveyor belt 40 and continuous cables 50 are disposed about respective pulley wheels 22–27, and are continuously driven by such pulleys. In the configuration depicted in FIG. 1, pulleys 22–24 are the drive pulleys for transporting materials (not shown) and pulleys 25–27 serve to drive the conveyor belt for returning same to an initial position for loading the materials to be transported. Thus, in this particular configuration, materials are transported from point A in a horizontal path of travel by pulley 22, then in a vertically upward path of travel by pulley 23, until it reaches pulley 24. At that point, a horizontal path of travel is again provided for the materials being transported by pulley 24 until reaching the end point B where the materials are discharged for further processing. The pulley 25 is powered by an electrical motor and drive assembly which drives conveyor system 10 (not shown).

Continuous cylindrical cables 50 are typically formed of sturdy but flexible materials such as resilient polymeric materials or coated metal materials which are conventionally known and used for this purpose. A continuous conveyor belt 40 transports materials such as various fresh fruits and vegetables to be canned or packaged. The belt is typically fabricated of a polymeric material such as polypropylene, nylon, or other suitable polymeric materials. Since the continuous conveyor belt is typically formed of a plurality of sections connected one to the other without hinges or sectional rotational connecting means, it is important that the belt be fabricated of a material which is readily flexible, resists cracking, has an extremely high bending fatigue life, is abrasion resistant, and is easily cleaned after use.

The conveyor belt 40 comprises a plurality of open top pocket-like receptacles 42 formed between longitudinally-extending flange portions 44 and laterally extending flange portions 46. Each of the receptacles 42 comprises a bottom portion 48 and inwardly curved sides 49.

Figure 6:
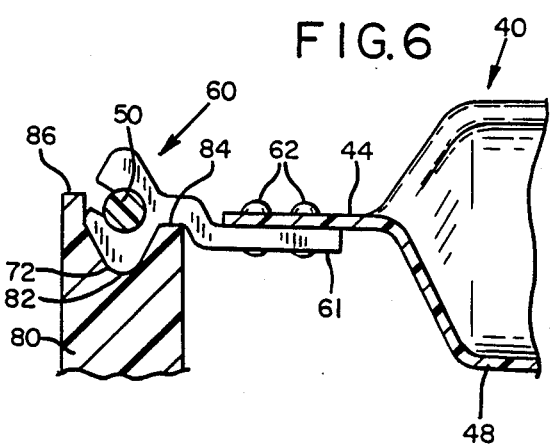
FIG. 6 is an end elevational, partially fragmentary view of the system depicted in FIG. 1 taken along lines 6—6.

Referring to FIG. 1, conveyor system 10 includes at the top of horizontal support members 18, generally parallel guide rails 80 located immediately below clip means 60. Guide rails 80 support clip means 60 as they ride on belt 40 for continuous movement during the transportation operation. As more specifically shown in FIG. 6, guide rail 80 includes groove means 82 for supportingly receiving the clip means 60 and for preventing substantial sagging of cables 50 due to the weight of belt 40 and the materials contained therein which are being transported. Guide rail groove means 82 is sized to substantially conform to the configuration of rounded lower end 72 of coupling means 70. Guide rail 80 comprises respective inner and outer raised sides 84 and 86, respectively. Outer side 86 preferably has a greater height than the height of inner side 84 for providing a further means of retaining clip means 60 within guide rail groove means 82 during the transportation of the materials by the conveyor system. Guide rail 80 is preferably fabricated from a rigid UHMW polymeric material and the like.

Figure 5:
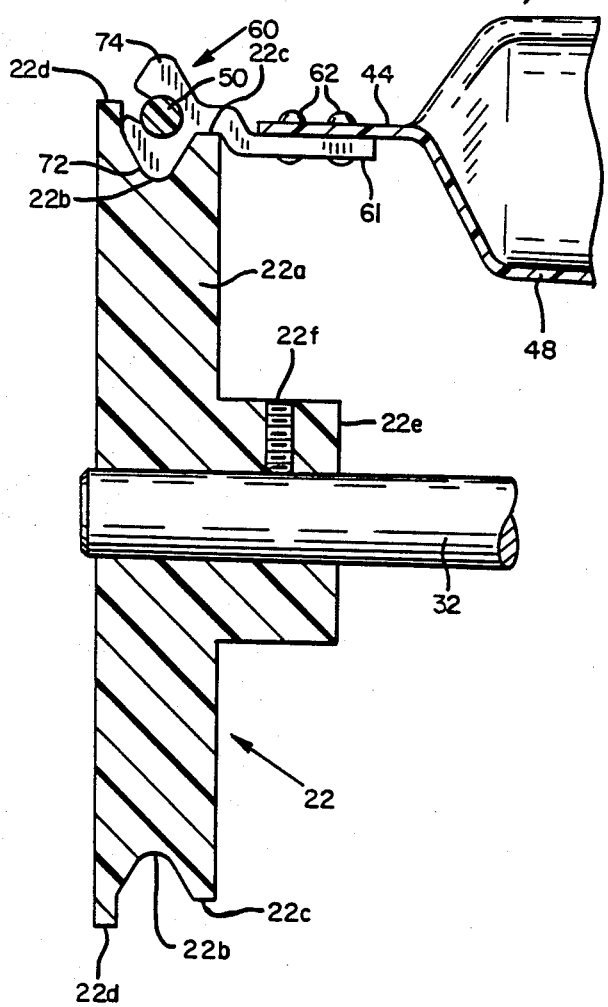
FIG. 5 is a side elevational, partially fragmentary view of the clip means riding within the pulley wheel groove means of a pulley wheel.
Figure 7:
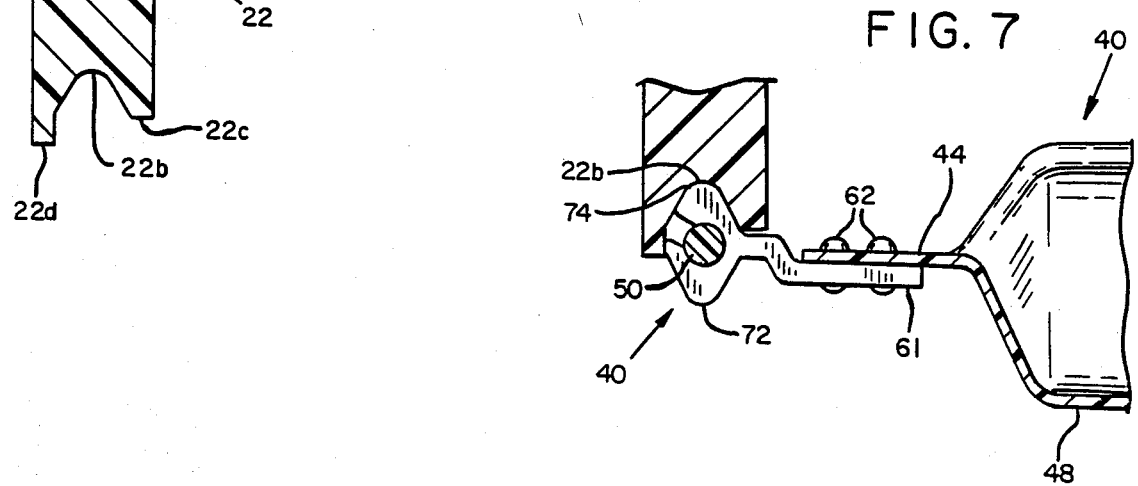
FIG. 7 is a side elevational, partially fragmentary view, similar to FIG. 5, but depicting the upper end of the coupling means disposed within the lower portion of the pulley wheel groove means.

As depicted in FIGS. 5 and 7, respectively, pulley wheel 22 comprises a wheel 22a including pulley wheel groove means 22b located in the circumference of the pulley wheel means 22. The other pulley wheels 23-27 are of similar construction. Pulley wheel 22a comprises respective inner and outer pulley wheel sections 22c and 22d, respectively, having a circumferentially extending pulley wheel groove means 22b disposed therebetween. Outer wheel section 22d has a larger diameter than inner wheel section 22c for providing a further means of retaining clip means 60 within pulley wheel groove means 22b during the transportation operation. As shown in FIG. 5, rounded lower end 72 of clip means 60 is sized to conform to the configuraation of pulley wheel groove means 22b and rides therewithin. Similarly, as provided in FIG. 7, upper rounded end 74 of clip means 60 is sized to conform to the configuration of pulley wheel groove means 22b. Pulley wheel means 22 is mounted for rotation about horizontal shaft 32 which passes through a central axial opening in pulley wheel hub 22e and is held in position by locking bolt 22f.

The importance of rounded ends 72 and 74 both being sized to conform to pulley wheel groove means 22b can be particularly understood by reference to FIG. 1. As conveyor belt 40 moves clockwise about pulley wheel 22, the lower ends 72 of clip means 60 engage pulley wheel groove means 22b and are directly driven by pulley 22. As belt 40 advances horizontally, it then engages pulley wheel 23. However, in order to move belt 40 in a vertical path of travel, pulley wheel means 23 directly drives the upper rounded end 74 of clip means 60 and moves the belt 40 through an angle of about 90°, from a horizontal to a vertical path of travel. Similarly, when belt 40 contacts pulley 24, it is again moved about 90° by engagement of the lower rounded end 72 of clip means 60 within the groove means of pulley wheel 24. Thus, by directly engaging clip means 60, pulley wheels 22-24 can effectively and efficiently drive conveyor belt 40 through a plurality of horizontal, vertical, and even inclined path.

Figure 4:
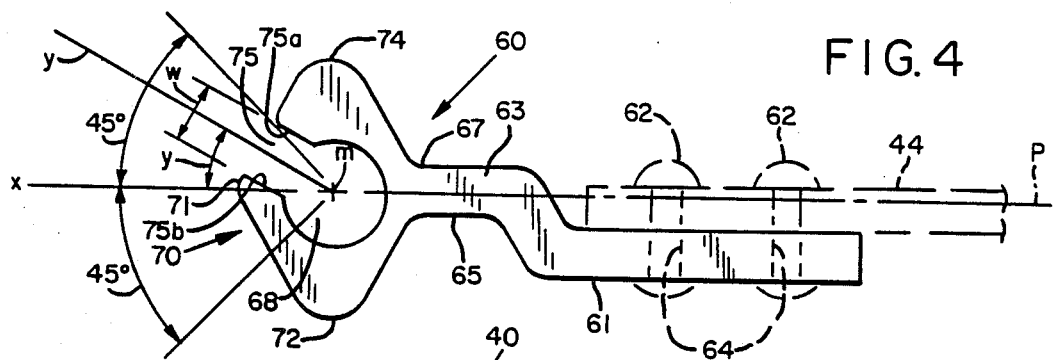
FIG. 4 is a side elevational, sectional view of the clip means of the present invention.

As depicted in FIGS. 2-4, clip means 60 is adapted for use in belt conveyor system 40. Clip means 60 comprises an arm section 61 having a pair of apertures 64 disposed therewithin for connecting clip means 60 to the longitudinal edges 44 of conveyor belt 40. The attachment is facilitated by rivet means 62. The outer end 63 of arm means 61 includes a slot means 65 formed at its lower portion which comprises an engagement surface. The upper portion 67 of outer end 63 also comprises an engagement surface. Thus, when the lower end 72 is disposed within groove means 22b of pulley wheel 22, or is disposed within groove means 82 of guide rail 80, slot means 65 engages inner side section 22c or inner wheel section 84, respectively, for facilitating maximum engagement of clip means 60 and either pulley wheel 22 or guide rail 80, respectively.

Arm means 61 is joined at its outer end to coupling means 70. Coupling means 70 includes means defining a cylindrical aperture 68 disposed parallel to the direction of travel of belt 40. Aperture 68 is sized to substantially conform to the diameter of cable 50 for surroundingly receiving and retaining the cable within the aperture. Means defining a passageway 75 at the outer end 71 of clip means 60 are disposed for engaging and disengaging cable 50 within aperture 68. Passageway 75 has a width W which is less than the cross-sectional diameter of cable 50 to allow the cable to yieldably pass through passageway 75 and into and out of aperture 68. Thus, upper side 75a and lower side 75b of passageway 75 are yieldably movable to an open position away from each other to allow cable 50 to be inserted within and out of aperture 68. To this end, coupling means 70 is fabricated of a resilient material capable of yielding to an extent which will allow cable 50 to pass therethrough. Thereafter, cable 50 is secured within aperture 68 when sides 75a and 75b are moved to its original closed position with passageway 75 being again at a width W.

Passageway 75 is oriented so that cable 50 will be inserted into the passage in a direction substantially transverse to the plane of travel of belt 40. More specifically, the passageway 75 is located within outer end 71 at any of a plurality of positions between an angle of 45° above and 45° below the transverse axis X of coupling means 70. In one form of this invention, transverse axis X extends in a plane parallel to the transverse plane P of conveyor belt 40 and through the midpoint M of cylindrical aperture 68. An angle Y is measured by extending a plane Y outwardly from the midpoint M of aperture 68 along the longitudinal centerline of passageway 75 to the outer end 71 of the coupling means 70. The opening formed by passageway 75 in outer end 71 is disposed in a plane parallel to the plane of travel of the conveyor belt 40. This passageway 75 forms a parallel plane of insertion and removal of cable 50 with respect to passageway 75. As shown in FIG. 4, the angle Y between line Y and transverse axis X is equal to about 27°. Since the angle Y is above the transverse axis, the angle is positive. Conversely, an angle below the transverse axis X will be considered a negative angle. It is preferred for purposes of this invention that passageway 75 be a positive angle located above the transverse axis X, up to about 45° above that axis, for facilitating the most effective and efficient insertion and removal operation of cable 50 into and out of aperture 68 at a maximum downwardly angular path. In another form of this invention, the opening formed by the passageway in outer end 71, denoted passageway 75 in FIG. 3, is disposed in a plurality of angular planes with respect to the plane of travel of conveyor belt 40. Therefore, passageway 75 is disposed in an angular plane of insertion and removal thereby further preventing accidental disengagement of the cable from aperture 68.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A conveyor system for transporting materials which comprises:
   a plurality of continuous cables which are disposed generally parallel one to the other;
   a continuous conveyor belt, disposed between said continuous cables, which includes a plurality of unitary, open top, pocket-like receptacles for transporting said materials;
   flat planar portions located between, and joined to, adjacent pocket-like receptacles;
   a plurality of connectors for connecting said continuous cables to said conveyor belt; and
   a plurality of drive means for driving said continuous conveyor belt; and
   said receptacles including a smooth, continuous concave surface, located so that they extend above and below the plane of travel of said continuous cables whereby said materials can be transported within the confines of said receptacles in both a horizontal path of travel and a vertical path of travel, respectively, until said materials are conveyed to the point of travel where they are discharged from the conveyor system for further subsequent processing.

2. The conveyor system of claim 1, wherein said continuous conveyor belt further includes longitudinally-extending flange portions to which said plurality of means for connecting said continuous cables to said conveyor belt are attached, said receptacles extending above and below said flange portions.

3. The conveyor system of claim 1, wherein said receptacles comprise laterally-extending flange portions and inwardly curved sides extending above the plane of travel of said continuous cables, and bottom portions extending below the plane of travel of said continuous cables.

4. The conveyor system of claim 2, wherein said receptacles comprise laterally-extending flange portions and inwardly curved sides extending above the plane of travel of said continuous cables, and bottom portions extending below the plane of travel of said continuous cables.

5. A method for transporting materials which comprises:
   providing a plurality of continuous cables disposed generally parallel one to the other, a continuous conveyor belt, disposed between said continuous cables, which includes a plurality of unitary, open top, pocket-like receptacles for transporting said materials, said receptacles including a smooth, continuous concave surface, flat planar portions located between, and joined to, each of the pocket-like receptacles, a plurality of means for connecting said continuous cables to said conveyor belt, and a plurality of drive means for driving said continuous conveyor belt; and
   locating said receptacles so that they extend above and below the plane of travel of said continuous cables whereby said materials can be transported within the confines of said receptacles in a horizontal path of travel and in a vertical path of travel, respectively, until said materials are conveyed to the point of travel where they are discharged from the conveyor system for further subsequent processing.

6. The method of claim 5, further including the step of providing said continuous conveyor belt with longitudinally-extending flange portions to which said plurality of means for connecting said continuous cables to said conveyor belt are attached.

7. The method of claim 5, further including the step of providing said receptacles which comprise laterally-extending flange portions and inwardly curved sides extending above the plane of travel of said continuous cables, and bottom portions extending below the plane of travel of said continuous cables.

8. The method of claim 6, further including the step of providing said receptacles which comprise laterally-extending flange portions and inwardly curved sides extending above the plane of travel of said continuous cables, and bottom portions extending below the plane of travel of said continuous cables.

9. A conveyor system for transporting materials which comprises:
   a plurality of continuous cables which are disposed generally parallel one to the other and which extends in respective horizontal and vertical planes for providing respective horizontal and vertical planes of travels of said materials being transported;
   a continuous conveyor belt, disposed between said continuous cables and which extends in respective horizontal and vertical planes for providing respective horizontal and vertical planes of travel, which includes a plurality of unitary, open top, pocket-like receptacles for transporting said materials in said respective horizontal and vertical paths of travel;
   flat planar portions located between, and joined to, adjacent pocket-like receptacles;
   a plurality of connectors for connecting said continuous cables to said conveyor belt; and
   a plurality of drive means for driving said continuous conveyor belt in said respective paths of travel; and
   said receptacles including a smooth, continuous surface, located so that they extend above and below the plane of travel of said continuous cables whereby said materials can be transported within the confines of said receptacles in both a horizontal path of travel and a vertical path of travel, respectively, until said materials are conveyed to the point of travel where they are discharged from the conveyor system for further subsequent processing.

10. The conveyor system of claim 9, wherein said path of travel of said materials being transported comprises a horizontal path of travel, to a vertically upward path of travel, and to a horizontal path of travel until the point where the materials are discharged.

11. A method for transporting materials which comprises:
providing a plurality of unitary, open top, pocket-like receptacles including a smooth continuous concave surface;
providing flat planar portions located between, and joined to, adjacent pocket-like receptacles; and
transporting said materials in said respective horizontal and vertical paths of travel until said materials are conveyed to the point of travel where they are discharged from the conveyor system for further subsequent processing.

12. The method of claim 11, which further includes locating said receptacles so that they extend above and below the plane of travel of said continuous cables whereby said materials can be transported within the confines of said receptacles in both a horizontal path of travel and a vertical path of travel, respectively.

13. The method of claim 12, which further includes providing said path of travel of said materials being transported which comprises a horizontal path of travel, to a vertically upward path of travel, and to a horizontal path of travel until the point where the materials are discharged.

14. The conveyor system of claim 2, wherein said flat planar portions are coplanar and integral with said laterally-extending flange portions.

15. The conveyor system of claim 6, providing said flat planar portions which are coplanar and integral with said laterally-extending flange portions.

16. The conveyor system of claim 9, wherein said receptacles comprise laterally-extending flange portions which are coplanar and integral with said flat planar portions.

* * * * *